(12) United States Patent
Hoppe et al.

(10) Patent No.: US 10,363,653 B2
(45) Date of Patent: Jul. 30, 2019

(54) ATTACHMENT DEVICE FOR A HAND TOOL

(71) Applicant: Milwaukee Electric Tool Corporation, Brookfield, WI (US)

(72) Inventors: Christopher S. Hoppe, Milwaukee, WI (US); Kyle Reeder, Waukesha, WI (US); Anthony S. Graykowski, Port Washington, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 15/664,581

(22) Filed: Jul. 31, 2017

(65) Prior Publication Data

US 2018/0029217 A1    Feb. 1, 2018

Related U.S. Application Data

(60) Provisional application No. 62/368,597, filed on Jul. 29, 2016.

(51) Int. Cl.
| | |
|---|---|
| B25H 3/00 | (2006.01) |
| B25G 1/10 | (2006.01) |
| F16B 2/22 | (2006.01) |
| B25B 7/00 | (2006.01) |
| B25B 15/02 | (2006.01) |
| B23D 29/02 | (2006.01) |

(52) U.S. Cl.
CPC ............... *B25H 3/006* (2013.01); *B25B 7/00* (2013.01); *B25B 15/02* (2013.01); *B25G 1/102* (2013.01); *B25H 3/00* (2013.01); *F16B 2/22* (2013.01); *B23D 29/026* (2013.01)

(58) Field of Classification Search
CPC ...................................................... B25H 3/006
See application file for complete search history.

(56) References Cited

U.S. PATENT DOCUMENTS

| | | | | |
|---|---|---|---|---|
| 3,872,861 | A * | 3/1975 | Tamny ..................... | A61F 5/04 602/36 |
| 3,883,102 | A * | 5/1975 | Trigg ....................... | G08G 1/02 24/115 K |
| 4,222,193 | A * | 9/1980 | Beck ....................... | A01K 97/08 206/15.11 |
| 4,966,167 | A * | 10/1990 | Jacobs ..................... | A61B 46/27 128/849 |
| 5,649,541 | A * | 7/1997 | Stuckey ................... | A61F 5/3761 128/880 |
| 7,001,292 | B1 * | 2/2006 | Rappaport ............... | A63B 65/02 473/570 |

(Continued)

*Primary Examiner* — Robert Sandy
*Assistant Examiner* — Michael S Lee
(74) *Attorney, Agent, or Firm* — Reinhart Boerner Van Deuren s.c.

(57) ABSTRACT

An attachment device for use with a hand tool having a handle portion with a distal end includes a connection member having a connection point, and a receiver coupled to and extending axially from the connection member to define a central channel having an open end. The receiver is configured to receive at least a portion of the handle portion within the central channel via the open end. The receiver is configured to permit the insertion of the handle portion into the central channel while restricting the removal of the handle portion therefrom.

16 Claims, 6 Drawing Sheets

(56) References Cited

U.S. PATENT DOCUMENTS

2005/0240136 A1\* 10/2005 Price .................... A61F 5/04
                                                    602/32
2014/0353561 A1\* 12/2014 Chen ................ G02B 6/4465
                                                    254/134.4

\* cited by examiner

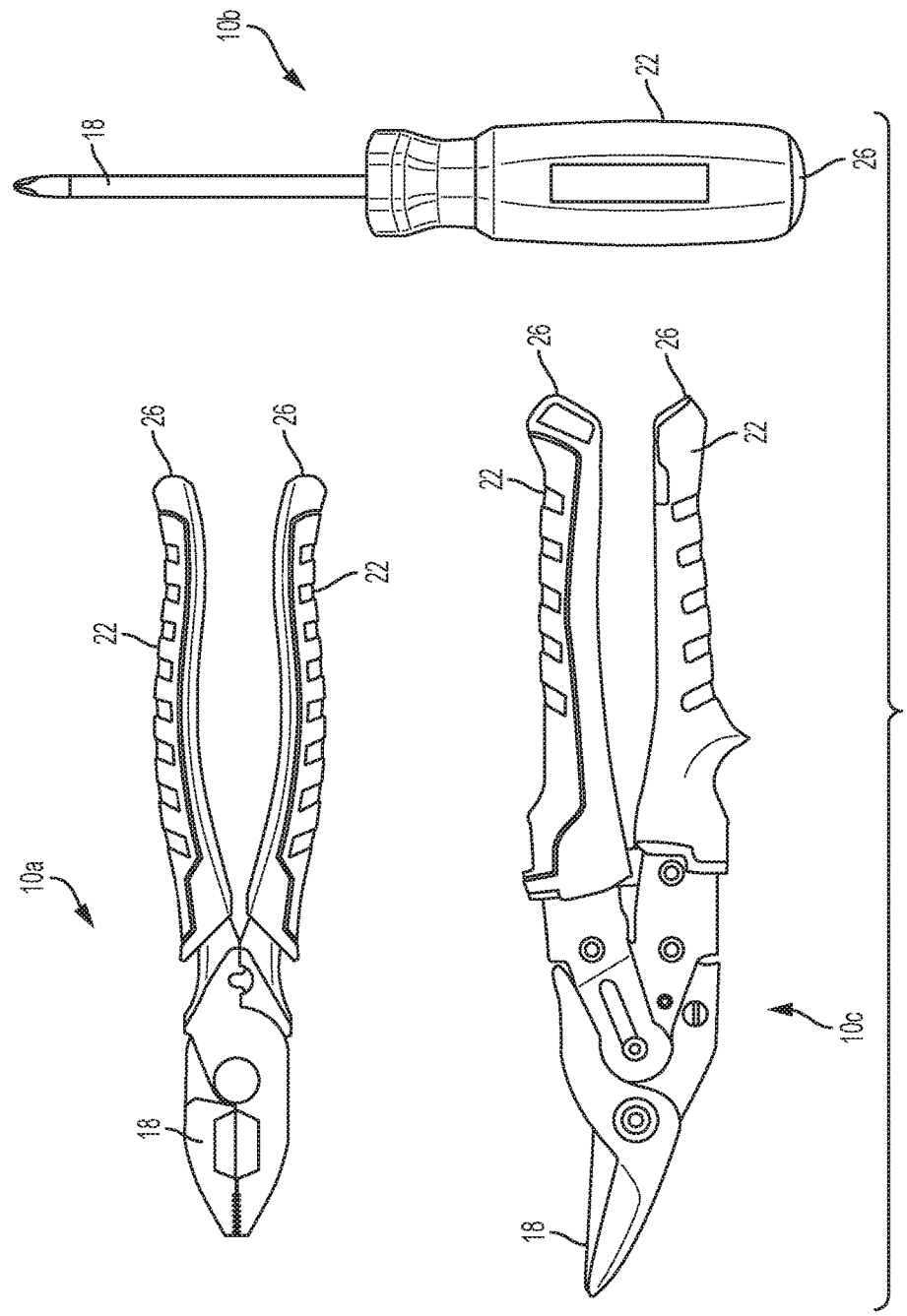

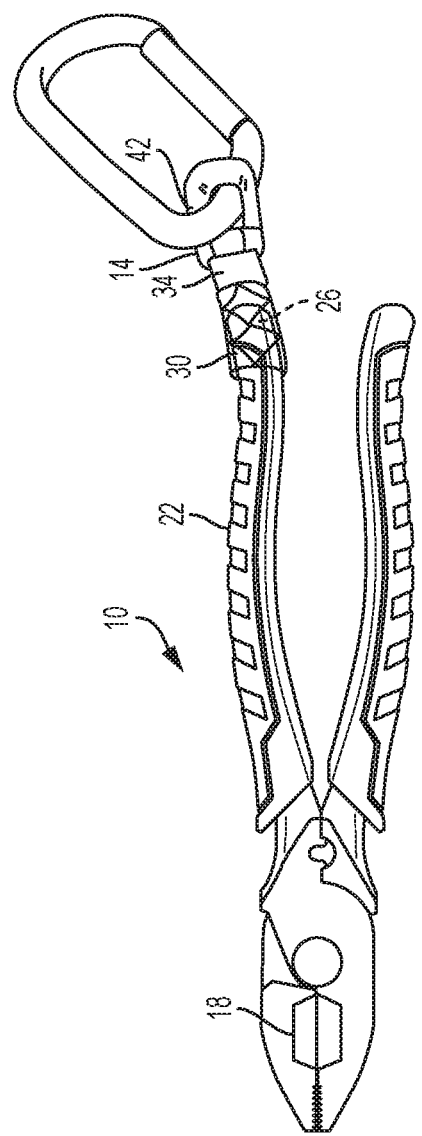

ATTACHMENT DEVICE FOR A HAND TOOL

CROSS-REFERENCE TO RELATED APPLICATIONS

This patent application claims priority to U.S. Provisional Patent Application No. 62/368,597, filed Jul. 29, 2016. The above referenced application is hereby incorporated by reference.

FIELD OF THE INVENTION

The present invention relates to hand tools and, more particularly, to attachment devices for hand tools.

BACKGROUND OF THE INVENTION

The storage, organization, and hanging of individual hand tools can be difficult given that many small hand tools do not include any form of connection point to which carabineers, lanyards, tethers and other external accessories can be attached. Furthermore, the lack of any connection point makes hanging the hand tool from a hook or other elevated mounting location difficult if not impossible. As such, many hand tools are placed in drawers or left on tabletops where they can be easily lost, misplaced, and difficult to organize.

SUMMARY OF THE INVENTION

In one embodiment, the invention provides an attachment device for use with a hand tool having a handle portion with a distal end. The attachment device includes a connection member having a connection point, and a receiver coupled to and extending axially from the connection member to define a central channel having an open end. The receiver is configured to receive at least a portion of the handle portion within the central channel via the open end. The receiver is configured to permit the insertion of the handle portion into the central channel while restricting the removal of the handle portion therefrom.

In another embodiment, the invention provides an attachment device for use with a hand tool having a handle portion with a distal end. The attachment device includes a connection member having a connection point, and a receiver coupled to and extending axially from the connection member to define a central channel having an open end. The central channel defines a variable inner diameter. The variable inner diameter is configured to increase when a compressing force is applied axially to the receiver, and is configured to decrease when a stretching force is applied axially to the receiver.

In still another embodiment, the invention provides an attachment device for use with a hand tool having a handle portion with a distal end. The attachment device includes a connection member having a connection point, and a receiver coupled to and extending axially from the connection member to define a central channel having an open end. The receiver is configured to apply a compressive force to the handle portion when the handle portion is positioned within the central channel. A magnitude of the compressive force is at least partially determined by a magnitude of a force applied axially to the connection member.

Other aspects of the invention will become apparent by consideration of the detailed description and accompanying drawings.

BRIEF DESCRIPTION OF THE DRAWINGS

FIG. 1 illustrates hand tools.
FIG. 4 illustrates the attachment of FIG. 2A connected to a hand tool.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 2A:
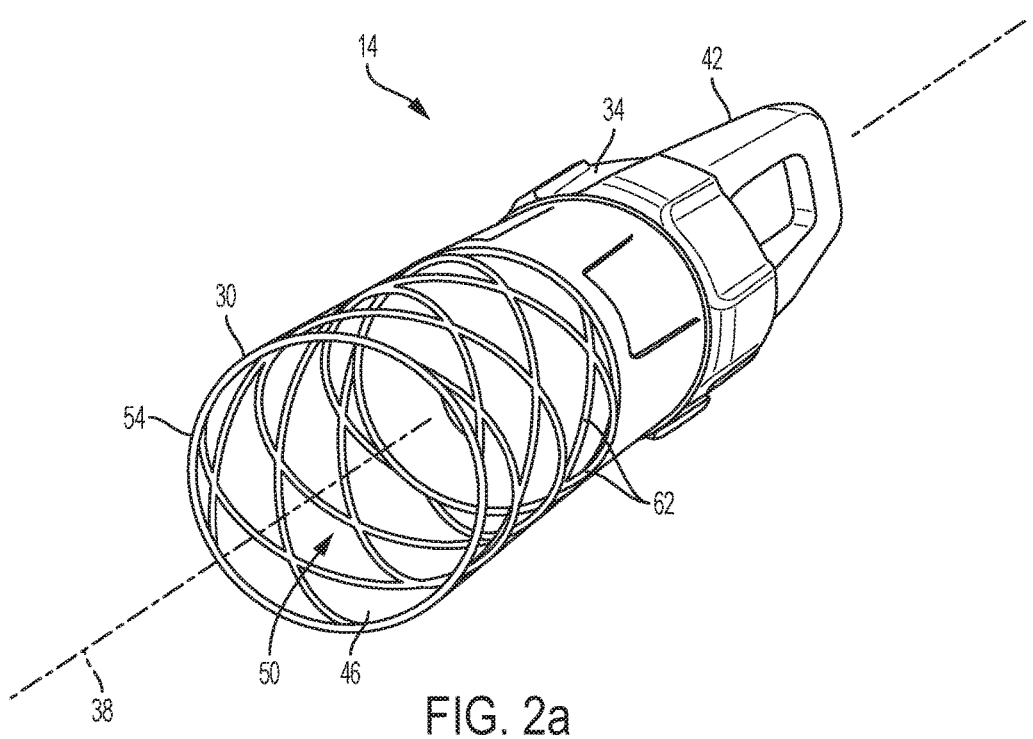
FIG. 2A illustrates an attachment device embodying the invention.

FIG. 1 illustrates various types of hand tools 10 to which an attachment device 14 (FIG. 2A) of the present invention may be mounted. The illustrated hand tools include a pliers 10a, a screwdriver 10b, and a snips 10c. While not illustrated, the invention is also applicable to other types of hand tools, including but not limited to, cable cutters, wire strippers, nut drivers, torque wrenches, hand saws, tubing cutters, scissors, utility knives, and the like.

Each hand tool 10 includes a working implement 18 and one or more handle portions 22 in operable communication with the working implement 18. The working implement 18 is generally a portion of the hand tool 10 configured to interact with and manipulate the work piece during use. For example, the working implement 18 may include the jaws of the pliers 10a, the tip of a screwdriver 10b, or the blades of the snips 10c.

The one or more handle portions 22 of the hand tool 10, in turn, are generally formed as elongated members, each extending away from the working implement 18 to form a distal end 26. During use, the user grasps and manipulates the one or more handle portions 22 to either operate the corresponding working implement 18 (e.g., open and close the jaws of the pliers 10a) and/or orient the hand tool 10 (e.g., rotate the screwdriver 10b). In the illustrated embodiment, the handle portion 22 of each hand tool 10 includes a complex cross-sectional shape configured to conform to the user's hand, generally tapering as it extends toward the distal end 26. In some implementations, the handle portion 22 may include finger grooves or other textures (see FIG. 1) to improve grip and comfort. Furthermore, the handle portions 22 may include guards, stops, and the like to protect the user's hand during use.

FIGS. 2 and 4 illustrate the attachment device 14 of the present invention for use with a hand tool 10, such as one of the hand tools shown in FIG. 1 or listed above (see FIG. 4). The attachment device 14 includes a connection member or base 34 to which supplemental accessories may be attached, and a receiver 30 extending from the connection member 34 and configured to receive and retain at least a portion of the corresponding hand tool 10 therein. During use, the attachment device 14 acts as an adapter being couplable to the handle portion 22 of the hand tool 10 to provide a connecting point 42 where no connecting point was initially present. While the attachment device 14 is shown being attached to the handle portion 22 of the hand tool 10, it is to be understood that the attachment device 14 may be coupled to any portion of the hand tool 10 that extends outwardly and includes a distal end about which the receiver 30 can be positioned around and at least partially encompass.

Illustrated in FIGS. 2 and 4, the connection member 34 of the attachment device 14 defines an axis 38 therethrough and includes a connection point 42. The connection point 42 provides a location to attach external accessories such as lanyards, tethers, carabineers, and the like (see FIG. 4). The connection point 42 also allows the attachment device 14 and connected hand tool 10 to be, for example, hung from a hook on a pegboard. In the illustrated embodiment, the connection point 42 includes a closed loop (see FIG. 2). In other embodiments, the connection point 42 may include other suitable types of connecting structures such as clips, magnets, Velcro, apertures, and the like. In still other embodiments, the connection point 42 may be detachable from the connection member 34 to provide modularity and adaptability. In still other embodiments, more than one connection point 42 may be present on a single connection member 34.

Illustrated in FIGS. 2 and 4, the receiver 30 of the attachment 14 is substantially cylindrical in shape, having a flexible annular wall 46 that extends axially away from the connection member 34 to define an open end 54. The annular wall 46 also defines an inner diameter 58 that forms a central channel 50 open to the open end 54 and sized to receive at least a portion of a corresponding distal end 26 of a handle portion 22 therein. More specifically, the receiver 30 is configured to allow the handle portion 22 to be axially inserted into the central channel 50 via the open end 54, but restricts the removal of the handle portion 22 therefrom.

Figure 2B:
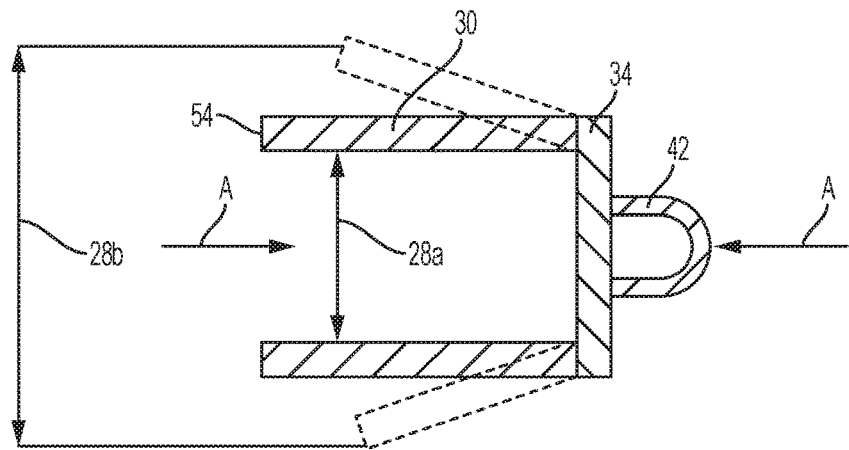
FIG. 2B illustrates the attachment device of FIG. 2A undergoing a compressing axial force.
Figure 2C:
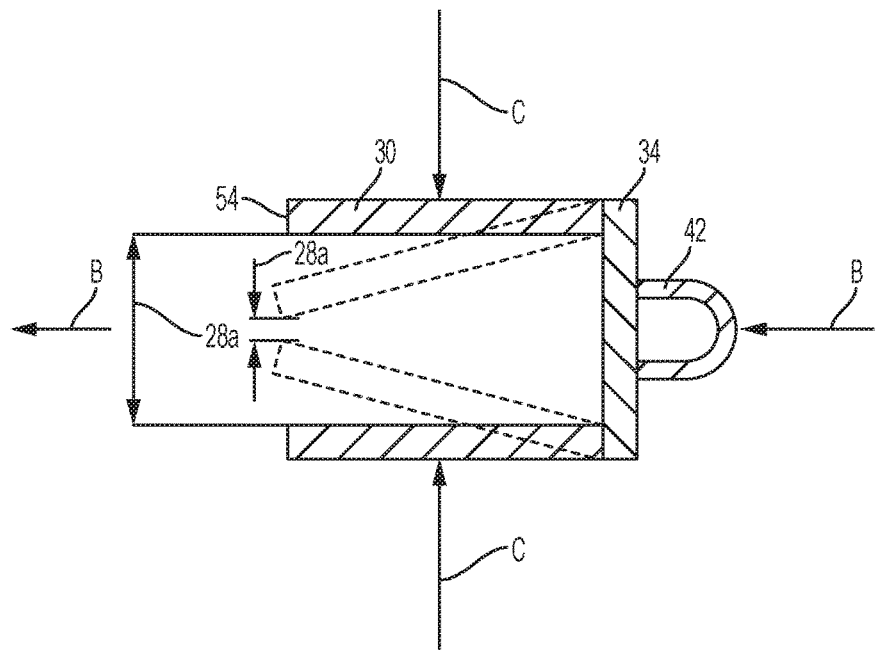
FIG. 2C illustrates the attachment device of FIG. 2A undergoing a stretching axial force.

The wall 46 of the receiver 30 is substantially annular in shape and formed from flexible material such as a mesh, rubber, webbed material, and the like. In the illustrated embodiment, the annular wall 46 is formed from a plurality of metal or polymer wires 62 woven together to form an annular shape. More specifically, the wires 62 are woven such that when no axial force is applied to the receiver 30, the annular wall 46 forms a first or rest inner diameter 28a. Furthermore, as shown in FIG. 2B, when a compressing axial force A is applied to the receiver 30, the wires 62 cause the inner diameter 58 of the annular wall 46 to expand from the rest inner diameter 28a to produce a second inner diameter 28b larger than the rest inner diameter 28a. Conversely, as shown in FIG. 2C, the wires 62 are woven such that when a stretching axial force B is applied to the receiver 30, the wires 62 cause the inner diameter 58 of the annular wall 46 to decrease from the rest inner diameter 28a to produce a third inner diameter 28c that is less than the rest inner diameter 28a.

Moreover, the expansion and contraction of the inner diameter 58 causes the annular wall 46 to apply a compressive force C against a handle portion 22 when at least a portion of the handle 22 is positioned within the central channel 50 of the receiver 30. For example, applying a stretching axial force B to the receiver 30 with a portion of the handle 22 positioned therein causes the inner diameter 58 of the annular wall 46 to reduce and compress onto the outer contour of the handle portion 22. The greater the stretching axial force B applied to the receiver 30, the greater the compressive force C applied to the handle portion 22. Furthermore, the compression of the annular wall 46 onto the handle 22 causes the annular wall 46 to conform to the unique outer shape of the handle 22, increasing the frictional force therebetween.

Although not illustrated, the receiver 30 may also include teeth, ratchets, and the like to physically engage the handle portion 22 and help restrict removal of the handle portion 22 from the central channel 50. Still further, the inner surface of the receiver 30 may include textures, coatings, and the like to increase the amount of friction formed between the wall 46 and the handle 22.

To use the attachment device 14, the user first aligns the open end 54 of the receiver with the distal end 26 of the handle portion 22 of the respective hand tool 10. Once aligned, the user then axially introduces the distal end 26 of the handle portion 22 into the open end 54 of the receiver 30.

In some instances, the distal end 26 may be slightly larger than the resting inner diameter 28a of the annular wall 46. In such instances, the handle portion 22 contacts the open end 54 of the wall 46, whereby the continued movement between the device 14 and tool 10 causes a compressing force A to be axially applied to the receiver 30. As such, the inner diameter 28 of the receiver 30 increases until the distal end 26 of the handle portion 22 enters into and is at least partially encompassed by the annular wall 46. The user can then continue to introduce the handle portion 22 into the central channel 50 until the distal end 26 of the handle 22 is positioned proximate the connection member 34.

With the handle portion 22 at least partially positioned within the central channel 50 of the receiver 30, the user may then attach the desired external accessories to the connection point 42 of the connection member 34.

Once attached, any subsequent attempt to remove the attachment device 14 from the handle portion 22 will result in a stretching force B being applied to the receiver 30. As described above, the stretching force B causes the inner diameter 28 of the annular wall 46 to reduce, applying a compressive force C against the handle 22. This compressive force, in turn, resists the removal of the handle portion 22 from the central channel 50, resulting in the attachment device 14 and the hand tool 10 remaining coupled together.

Figure 3A:
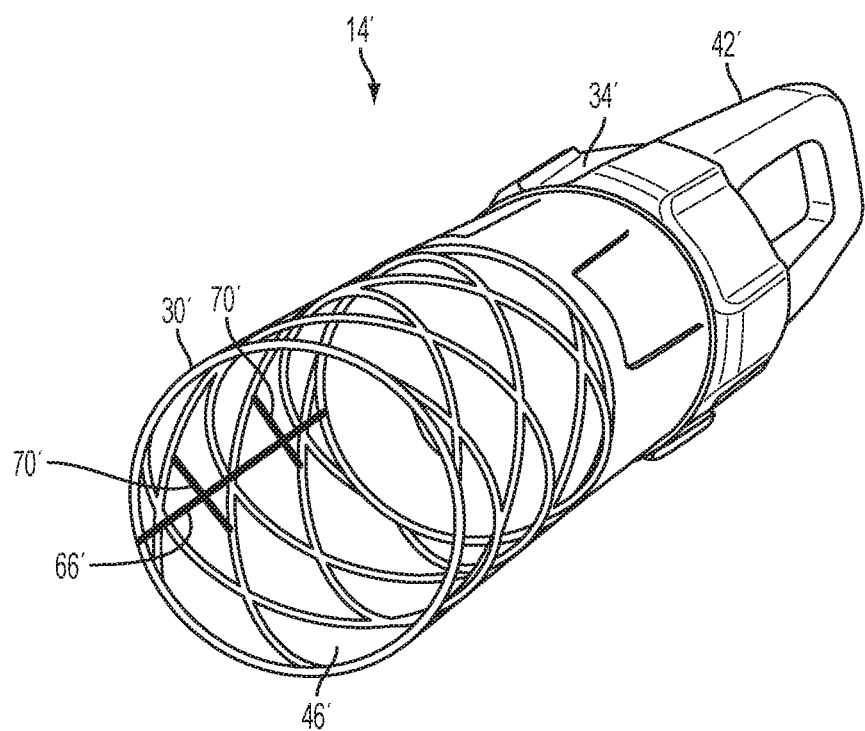
FIG. 3A illustrates another attachment device embodying the invention.
Figure 3B:
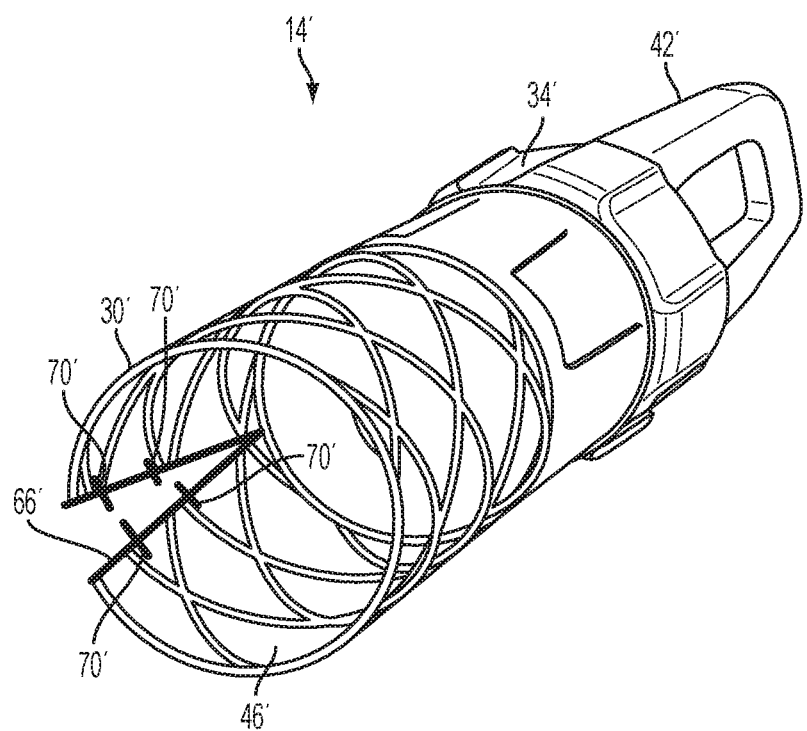
FIG. 3B illustrates the attachment device of FIG. 3A in a disconnected configuration.

FIGS. 3A and 3B illustrate another embodiment of the attachment device 14'. The attachment device 14' is substantially similar to the attachment device 14 shown in FIG. 2 and therefore only the differences will be described herein. The illustrated receiver 30' includes a split or break 66' extending axially along the length of the annular wall 46'. The split 66' allows the annular wall 46' of the receiver 30' to temporarily disconnect from itself and open (e.g., the annular wall 46' is straightened out circumferentially, see FIG. 3B). Once open, the annular wall 46' may be wrapped around a portion of the handle 22 and subsequently secured with a latch 70' (e.g., Velcro, snaps, clips, hooks, and the like).

Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. An attachment device for use with a hand tool having a handle portion with a distal end, the attachment device comprising:

a connection member having a connection point; and a receiver including a flexible annular wall extending axially from the connection member to define a central channel having an open end, the receiver configured to receive at least a portion of the handle portion within the central channel via the open end, and wherein the receiver includes a split extending axially along the length of the annular wall to allow the annular wall to disconnect from itself, and wherein the receiver is adjustable between a secured configuration, in which ends of the annular wall are coupled to one another, and a disconnected configuration, in which the ends of the annular wall are not coupled to one another so the annular wall may be wrapped around the handle portion, and wherein the annular wall may be wrapped around the handle portion when the receiver is in the disconnected configuration, and wherein the receiver allows the handle portion to be axially inserted into the central channel while restricting the removal of the handle portion therefrom when the receiver is in the secured configuration.

2. The attachment device of claim 1, wherein the connection point includes a closed loop.

3. The attachment device of claim 1, wherein the flexible annular wall defines an inner diameter forming the central channel, and wherein the inner diameter is variable.

4. The attachment device of claim 3, wherein the inner diameter is variable based at least in part on a magnitude of a force applied axially to the connection member.

5. The attachment device of claim 1, wherein the receiver is configured to apply a compressive force to the handle portion when the receiver is in the secured configuration, and wherein a magnitude of the compressive force applied to the handle portion is based at least in part on a magnitude of a force applied axially to the connection member.

6. The attachment device of claim 1, wherein the annular wall is formed from one or more wires.

7. The attachment device of claim 1, further comprising an external accessory coupled to the connection point.

8. An attachment device for use with a hand tool having a handle portion with a distal end, the attachment device comprising:
a connection member having a connection point; and
a receiver coupled to and extending axially from the connection member to define a central channel having an open end, the central channel defining a variable inner diameter, wherein the receiver includes a split to allow the receiver to disconnect from itself, and wherein the central channel is adjustable between a disconnected configuration, in which ends of the receiver are not coupled together, and a secured configuration, in which the ends of the receiver are secured together with a latch, and wherein the variable inner diameter is configured to increase when a compressing force is applied axially to the receiver and the central channel is in the secured configuration, and wherein the variable inner diameter is configured to decrease when a stretching force is applied axially to the receiver and the central channel is in the secured configuration.

9. The attachment device of claim 8, wherein the connection point is a closed loop.

10. The attachment device of claim 8, wherein the flexible annular wall is formed from mesh.

11. The attachment device of claim 8, wherein the flexible annular wall includes one or more wires formed therein.

12. The attachment device of claim 8, wherein the receiver is configured to apply a compressive force to the handle portion when the handle portion is positioned within the central channel, and wherein a magnitude of the compressive force applied to the handle portion is based at least in part on a magnitude of the stretching force.

13. An attachment device for use with a hand tool having a handle portion with a distal end, the attachment device comprising:
a connection member including a connection point; and
a receiver including a flexible annular wall coupled to and extending axially from the connection member to define a central channel having an open end, wherein the receiver includes a split extending axially along the length of the annular wall to allow the annular wall to disconnect from itself, and wherein ends of the annular wall are configured to selectively disconnect from another, and wherein the receiver is configured to apply a compressive force to the handle portion when the handle portion is positioned within the central channel, and wherein a magnitude of the compressive force is at least partially determined by a magnitude of a force applied axially to the connection member.

14. The attachment device of claim 13, wherein the connection point is a closed loop.

15. The attachment device of claim 13, wherein the flexible annular wall defines an inner diameter forming the central channel, and wherein the inner diameter is variable.

16. The attachment device of claim 15, wherein the inner diameter is variable based at least in part on the magnitude of the force applied axially to the connection member.

* * * * *